Nov. 15, 1927.

R. C. MATTHEWS

DISAPPEARING SEAT

Filed Feb. 18, 1924

1,649,608

2 Sheets-Sheet 1

WITNESSES.
Alice E. Holt
Charles B. Moulthrop

INVENTOR
Roy C. Matthews.
BY
Lucian E. Jackson
ATTORNEY.

Nov. 15, 1927.
R. C. MATTHEWS
1,649,608
DISAPPEARING SEAT
Filed Feb. 18, 1924    2 Sheets-Sheet 2
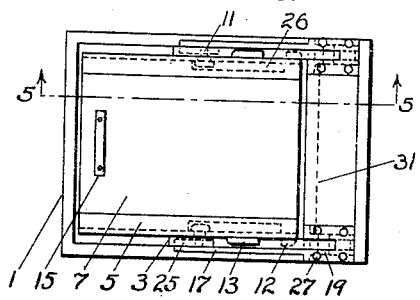
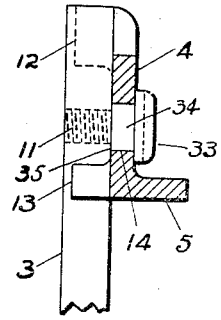
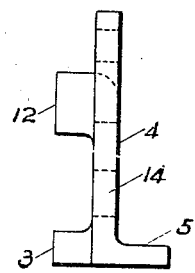
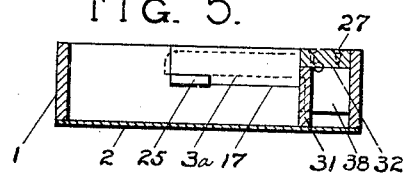
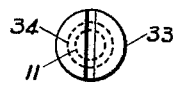
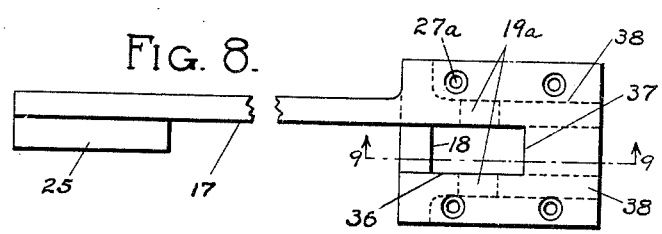
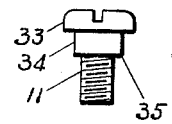
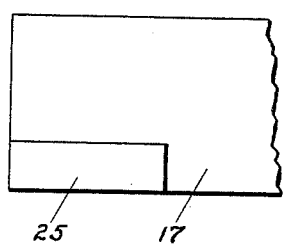
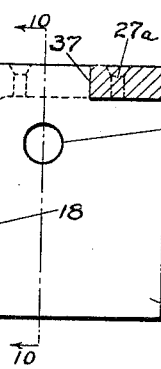
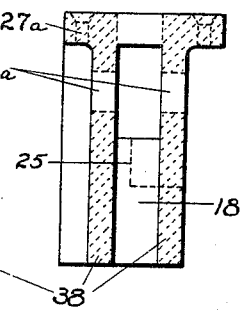
WITNESSES.
Alice E. Holt
Charles B. Moultrop
INVENTOR.
Roy C. Matthews.
BY
Lucian Jackson
ATTORNEY.

Patented Nov. 15, 1927.

1,649,603

UNITED STATES PATENT OFFICE.

ROY C. MATTHEWS, OF BUFFALO, NEW YORK.

DISAPPEARING SEAT.

Application filed February 18, 1924. Serial No. 693,416.

The invention relates to collapsible seats which can be made to disappear into the floor and more particularly to intermediate seats in an automobile such as of the type which are commonly provided, in addition to the front and rear seats, with some form of auxiliary seat or seats generally mounted for swinging or folding movement in the body between the front and rear seats.

The object of the invention is to provide a new and improved collapsible seat which is arranged for convenient extension to support a person facing forward and without interfering with the occupants of the rear seat, and which can be easily and compactly folded and made to disappear into the floor of the car and flush with it. Thus the seat is entirely concealed without showing evidence of its presence except for a handle directly back of, and close to the front seat, for raising it and the space between the front and rear seats is entirely unencumbered by projections or enlargements for holding a folding seat in the back of the front seat as is now the most common practice.

Another object is to provide a disappearing seat which does not fold into the back of the front seat, thereby making the back of the front seat thicker than would otherwise be necessary or taking up needed space for the cushion springs.

Another object is to provide a disappearing seat which does not slide under the front seat, thereby raising the front seat or taking up needed space for the seat springs.

Another object is to provide a disappearing seat which when in extended and normal position of use is lower than the back seat and yet furnishes adequate leg room for its occupant the same as the back seat. This is accomplished by providing a receptacle or box with a floor below the car floor to hold the disappearing seat and using this same box for the feet of the occupant of the disappearing seat. In this way the disappearing seat does not need to be raised as far above the car floor as the rear seat to get the same leg room.

With these objects in view, the invention consists in certain features of novelty in the construction, combination and arrangement of parts by which the said objects and certain other objects which will hereinafter appear are attained, the invention being more particularly pointed out in the claims.

Figure 2:
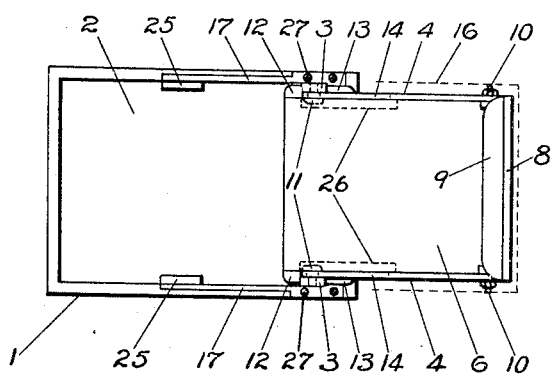
Figure 3:
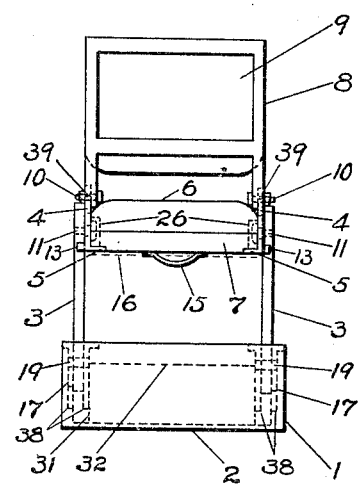
Figure 1:
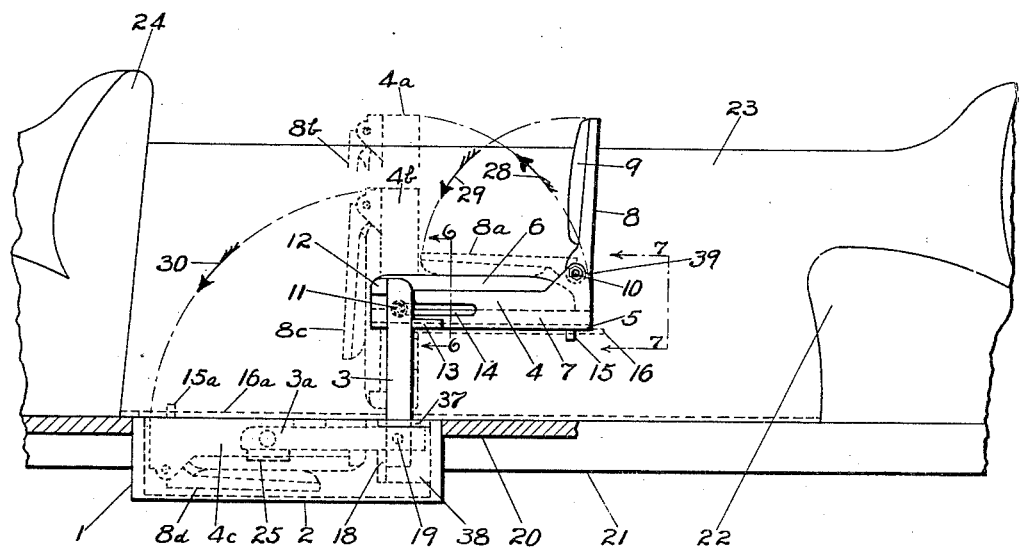

In the drawings accompanying and forming a part of this specification and in which like symbols refer to the same or similar parts in the different views, Figure 1, is a side elevation of my improved disappearing seat, unfolded and in normal position for occupancy and showing in dotted outline and with suitable arrows the various steps in folding and sliding the parts of the seat together to cause them to nest into its container or box beneath the automobile floor between the front and rear seats. Fig. 2, is a top view of the seat when open as in Fig. 1 and its container. Fig. 3, is a rear elevation of the seat when open as in Figs. 1 and 2 and its container. Fig. 4, is a top view of the seat when nested into its container and without a covering of carpet as shown dotted in Fig. 1. Fig. 5, is a side sectional elevation of the container on line 5—5 of Fig. 4 and without the seat except for a dotted portion of the leg showing its position when folded. Fig. 6 is a sectional elevation of one side of the seat frame on line 6—6 of Fig. 1. Fig. 7, is an end view of the seat frame shown in Fig. 6 and seen from the position 7—7 in Fig. 1.

Fig. 8, is a top view of one of the castings for supporting the seat leg and which is fastened into the container. Fig. 9, is a side sectional elevation of the casting shown in Fig. 8 and sectioned on the line 9—9 of Fig. 8. Fig. 10, is a rear end elevation of the casting shown in Fig. 9 and showing a dotted section on line 10—10 of Fig. 9. Figs. 11 and 12 are top and side elevations of the pivot screw connecting the seat to the upper part of its supporting legs.

In the figures, 1 is the container or box built into the floor of the car and having its top edges flush with the top of the car floor 20. 2 is the floor in the bottom of the container 1. 17, 17 are two members (shown in detail in Figs. 8, 9 and 10) which are fashioned to fit into the box 1 as shown in Figs. 1, 2 and 3 for supporting legs or standards 3, 3 on the pivots 19, 19 in a normally upright position when in use and legs 3, 3 in turn support the seat 6 in a normally horizontal position. 4, 4 are side rails of the seat 6, an end view or cross section of which shows them to be formed in the shape of an L (Figs. 6 and 7), and the lower flanges of which 5, 5 support the bottom member 7 of the seat 6. Each side rail 4, 4 has a slot 14 to fit the pivot screw 11 on its diameter 34 (Fig. 12). 12 and 13 are upper and lower stops on side rails 4, 4 engaging with the front and rear respectively of the legs 3, 3 and which together with the pivots 11, 11 support the seat 6 in a substantially horizontal position for use as shown in Fig. 1. 9 is a back for the seat 6 and having a frame 8 which is pivoted to the side rails 4, 4 by the pivot bolts 10, 10 and limited to a rearward movement slightly beyond the vertical by the stops 39, 39.

Figs. 8, 9 and 10 show one of the two members 17 in detail. They are identical in shape except they are made right and left as shown in Fig. 2, and having stops 25, 25 facing each other. These stops 25, 25 support the legs 3, 3 marked 3ª when the seat is folded and in the box 1 (Fig. 1). The surfaces 18 and 37 of member 17 form stops for the legs or standards 3, 3 when in an upright position as shown in Fig. 1, and engage the front and rear respectively of the legs 3, 3 below and above the pivot 19 to brace the legs against the rearward acting force caused by the weight of an occupant in the seat 6. 17 is fastened to the box 1 by means of screws 27, 27, etc. in the holes 27ª, 27ª, etc. 38, 38 are parallel vertical sides of the member 17 through which the pivot holes 19ª, 19ª are formed for the pivot 19 and between which the legs 3, 3 move in being raised or lowered in the slot 36.

In Figs. 6 and 7 are shown the details of the side rails 4 of the seat 6 with the flange 5 and stops 12 and 13 for the leg 3. Also the pivot screw 11 with its bearing surface 34 in the slot 14 of the side rail 4. The pivot screw 11 is screwed into the leg 3 to its shoulder 35 and the head 33 of the pivot screw guides the side rail 4 in its movements. 26, 26 are recesses in seat 6 to clear the head 33 of the screw 11, (Figs. 2 and 3).

31 and 32 in Figs. 4 and 5 shows a partition and a filling piece in the box 1 for supporting the members 17, 17. Also in Fig. 5, dotted leg 3ª is the folded position of leg 3 when supported on the stop 25.

Referring again to Fig. 1, 23 is the side of an automobile body, 22 is the back seat and 24 the front seat. Between the seats 22 and 24 and in the floor 20 is placed the box 1 for holding my improved disappearing seat. 21 represents the frame of the car.

The different positions of the parts of the seat when folded are shown in dotted lines with the pivoting motions indicated by arrows on the arcs of circles as 29, 28 and 30. The different positions of the back 8 in folding are indicated by 8ª, 8ᵇ, 8ᶜ and 8ᵈ. Those of the side rail 4 are shown as 4ª, 4ᵇ and 4ᶜ. The seat leg 3 when folded is at 3ª. 16 is a piece of carpet, corresponding to the carpet used on the car floor 20 and fastened to the bottom of the seat 6. When the seat is folded into place the carpet 16 takes the position 16ª and fits the floor carpet making a continuous piece therewith. 15 is a strap handle fastened to the bottom of seat 6 and shows a loop at 15ª when the seat is folded and for raising it when wanted for use.

The operation of the seat is as follows: Assuming the seat to be in its open and operatively normal position it is made to disappear by folding the back 8 on its pivots 10, 10 describing the arc 29 to the dotted position 8ª. The seat 6 and back 8ª are then raised on the pivots 11, 11 describing the arc 28 to the dotted position 4ª and 8ᵇ. The seat is then pushed down from 4ª to 4ᵇ (8ᵇ moving to 8ᶜ) telescoping by means of the slots 14, 14 sliding down over the pivots 11, 11 while the stops 12, 12 and 13, 13 form guides on opposite sides of the legs 3, 3. The seat and legs are then folded down into the box 1 on the pivots 19, 19 by 4ᵇ describing the arc 30. The legs 3, 3 come to rest at 3ª on the stops 25, 25 and 8ᶜ assuming the position 8ᵈ. 16ª then shows the carpet making a continuous piece on the floor of the car and 15ª the only indication of an auxiliary seat.

The operation of raising and opening the seat for use is then in inverse order to that of closing and storing the seat as just described. It will thus be seen that in my improved disappearing seat it is collapsed and stored entirely out of the way in the car without interfering with the springs, cushions or back of the front seat or the space in front of the back seat and also allows of the seat being lower than would otherwise be the case when in use, as the occupant uses the bottom of the box 1 for foot room. This auxiliary seat can then be as much lower than the back seat as the bottom of box 1 is lower than the floor of the car and the seat legs therefore shorter and sturdier than would otherwise be the case.

It will also be understood that the seat 6 can be arranged to occupy any convenient position in reference to the front seat when open for occupancy by placing the pivots 11, 11, stops 12 and 13 and slot 14 so as to locate the seat forward or back of the position shown as desired.

Having thus described my invention what I claim is:

1. A disappearing seat, comprising a standard part normally in an upright position and pivoted at its lower end for motion and support and adapted to be raised from a horizontal position to said normal position, a pivot on the upper end of said standard part, a seat part pivoted at the top of said standard part and normally extending horizontally rearward therefrom and adapted to be moved in an upright direction in line with said standard part, stops on said seat part adapted to engage with opposite sides of said standard part to guide said seat part in line with said standard part when said seat part is moved in an upright direction, said seat part adapted to be rotated on said pivot at the end of its upright movement where it is supported, independent of said pivot, in its normal horizontal position by means of said stops, and a back pivoted to the rear of said seat part normally in an upright position and adapted to be unfolded from a horizontal to said upright position.

2. In combination, in a disappearing seat, a seat part, seat supporting legs pivotally connected to the forward part of said seat part, and means for holding the seat part and legs in a fixed relationship with the seat part substantially horizontal, comprising said pivot carried by said legs and a pair of stops carried by said seat part and adjacent said pivot to engage said legs, said stops engaging the front of said legs above said pivot and the rear of said legs below said pivot, whereby the weight on said seat is entirely carried by said stops.

3. In combination, in a disappearing seat, a seat part, seat supporting legs pivotally connected to the forward part of said seat part, means for holding the seat part and legs in a fixed relationship with the seat part substantially horizontal and at right angles to the legs, comprising a pivot carried by said legs and a pair of stops carried by said seat part adjacent to and on opposite sides of said pivot to engage said legs, and means in said seat part cooperating with said pivot, whereby said seat part may be folded on said pivot to a position in line with said legs and telescoped therewith, said means including stops to limit the movement of said seat to a position in line with said legs and also forming guides for the seat in telescoping with said legs, and slots to encompass said pivots and limit the movement of said telescoping movement.

4. A disappearing seat for vehicles, comprising a container mounted in and extending below the floor of said vehicle, a member on each side of said container, a seat base, a pair of seat supporting legs pivotally connected to said side members in said container and to said seat base, means for supporting said legs in an upright position, said means consisting of a pivot on each leg and two stops on each of said members and adjacent said pivot, one above and one below said pivot and spaced laterally from each other the width of said leg, whereby the horizontal thrust occasioned by a weight on said seat is entirely carried by said stops, means for supporting said seat base in a horizontal position, said means consisting of a pivot on each leg and two stops on said seat base adjacent said pivot, one forward of and one to the rear of said pivot and spaced laterally from each other the width of said leg, whereby the pressure occasioned by a weight on said seat is entirely carried by said stops, and means on said seat base including said seat base stops cooperating with said legs, whereby said seat base may be folded in line with said legs to telescope therewith and thereby be nested with said legs into said container.

5. In combination, a vehicle body provided with a seat storage container open at the top and mounted in a suitable aperture in the body floor, members on each side of said container, each member having a pivot and a slot to the rear of said container opening, standard parts pivoted at their lower ends to said side member pivots and operative in said slots, said side members having two stops spaced adjacent said pivot to hold said standard parts normally in an upright position, stops on said side members for supporting said standard parts when nested into said container, a seat part pivoted to said standard parts, stops on said seat part coacting on each side of said standard parts to support said seat part when normally in a horizontal position, a back pivoted to said seat part and normally in an upright position, and means to fold said back, seat and standard parts on said pivots and nest them into said container, whereby the bottom of said seat part closes the opening of said container only forward of said pivots in said side member slots.

In testimony whereof, I hereunto affix my signature.

ROY C. MATTHEWS.